United States Patent
Butts et al.

[11] Patent Number: 6,015,302
[45] Date of Patent: *Jan. 18, 2000

[54] POWER DISTRIBUTION CENTER

[75] Inventors: Lawrence D. Butts, Shelby Township; Charles L. Robinson, Clinton Township; Douglas Simpson, Mount Clemens; Joseph L. Dery, White Lake Township, all of Mich.

[73] Assignee: Thomas & Betts International, Inc., Memphis, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/955,643

[22] Filed: Oct. 22, 1997

Related U.S. Application Data

[60] Provisional application No. 60/029,247, Oct. 24, 1996.

[51] Int. Cl.$^7$ .................................................. H01R 9/09
[52] U.S. Cl. .......................... 439/76.2; 439/949; 439/850
[58] Field of Search .................................. 439/76.2, 949, 439/931, 858, 856, 849, 850

[56] References Cited

U.S. PATENT DOCUMENTS

| | | | |
|---|---|---|---|
| 3,659,243 | 4/1972 | Gluntz | 439/858 |
| 3,918,784 | 11/1975 | Lemke et al. | 439/858 |
| 4,355,853 | 10/1982 | Kourimsky | 439/65 |
| 4,684,188 | 8/1987 | Klembus et al. | 439/587 |
| 4,687,270 | 8/1987 | Plyler et al. | 439/350 |
| 4,688,149 | 8/1987 | Inoue et al. | 361/752 |
| 4,689,718 | 8/1987 | Maue et al. | 361/686 |
| 4,689,752 | 8/1987 | Fernandes et al. | 364/528.27 |
| 4,713,026 | 12/1987 | Mobley et al. | 439/845 |
| 4,747,791 | 5/1988 | Nishio | 439/638 |
| 4,811,168 | 3/1989 | Chesnut et al. | 361/752 |
| 4,894,018 | 1/1990 | Phillips et al. | 439/81 |
| 4,909,745 | 3/1990 | Hayashi | 439/76.2 |
| 5,023,752 | 6/1991 | Detter et al. | 361/752 |
| 5,207,587 | 5/1993 | Hamill et al. | 439/76.2 |
| 5,285,011 | 2/1994 | Shimochi | 174/52.1 |
| 5,295,842 | 3/1994 | Ozaki et al. | 439/76.2 |
| 5,310,353 | 5/1994 | Parrish et al. | 439/76.2 |
| 5,353,190 | 10/1994 | Nakayama et al. | 361/647 |
| 5,474,475 | 12/1995 | Yamaguchi | 439/621 |
| 5,510,948 | 4/1996 | Tremaine et al. | 361/90 |
| 5,513,077 | 4/1996 | Stribel | 361/794 |
| 5,581,130 | 12/1996 | Boucheron | 439/76.2 |
| 5,608,611 | 3/1997 | Szudarek et al. | 361/753 |
| 5,727,956 | 3/1998 | Mitra et al. | 439/931 |
| 5,764,487 | 6/1998 | Natsume | 439/76.2 |

*Primary Examiner*—Steven L. Stephan
*Assistant Examiner*—T C Patel
*Attorney, Agent, or Firm*—Weingarten, Schurgin, Gagnebin & Hayes LLP

[57] ABSTRACT

A Power Distribution Center (PDC) for a motor vehicle distributes power through relays and fuses to connectors for distribution of power throughout the motor vehicle. The PDC includes a housing/connector plate, a printed circuit board, a leadframe assembly, an insulator, a B+ buss bar, an alignment plate and a cover. The PDC utilizes the B+ Buss bar assembly for receiving power into the PDC. The leadframe assembly is utilized to distribute power within the PDC to particular circuits. The printed circuit board is employed to distribute power and signals within the PDC. Terminal clips are used to interconnect between the PDC and associated relays and fuses. The PDC is configured to allow simple addition of electronic modules by providing an interface as part of the PDC, thereby allowing modules to be added to the network without requiring a separate wiring harness for each module.

13 Claims, 8 Drawing Sheets

POWER DISTRIBUTION CENTER

CROSS-REFERENCE TO RELATED APPLICATIONS

This application claims priority under 35 U.S.C. § 119(e) to provisional patent application Ser. No. 60/029,247 filed Oct. 24, 1996; the disclosure of which is incorporated herein by reference.

STATEMENT REGARDING FEDERALLY SPONSORED RESEARCH OR DEVELOPMENT

Not applicable.

BACKGROUND OF THE INVENTION

Current motor vehicles utilize a fuse box or power distribution center in conjunction with a wiring harness to distribute power to various components of the vehicle. The fuse box typically contains a plurality of fuses and relays and has multiple connectors from the wiring harness plugging into it for distributing the power through the vehicle. In order to distribute the power properly, several feeds off of a power main from the motor vehicle battery and/or alternator are segregated into individual circuits having their own fuse or relay by way of wires, conductive ribbons and interfaces. This requires a great deal of wiring, typically in the form of a bulky harness, and several levels of interconnect. This arrangement also requires a large number of parts and does not allow for the convenient addition of circuitry. For example U.S. Pat. No. 5,207,587 to Hamill et al. discloses an electrical distribution center including a main bus plate and two or more wire bus plates which include a plurality of wires for making contact with blade terminals. Electrical problems relating to power distribution in a motor vehicle are among the most difficult to diagnose and repair. Additionally, newer motor vehicles include "smart" modules, with each smart module requiring its own wire harness to the fuse box. An example of a smart module would be a heater/air conditioner control which determines the present temperature inside the motor vehicle and controls relays which turn on and off the heater or air conditioner in order to maintain the environment inside the motor vehicle within the desired temperature range. It is expected that the complexity and number of smart modules in vehicles will continue to grow in the future.

BRIEF SUMMARY OF THE INVENTION

A Power Distribution Center (PDC) for a motor vehicle distributes power from a buss bar within the PDC, through relays, fuses and other electronic devices to a printed circuit board and/or leadframe assembly to output connectors for distribution of power throughout the motor vehicle. The PDC includes a housing/connector plate, a printed circuit board, a leadframe assembly, an insulator, a B+ buss bar, an alignment plate and a cover. The PDC utilizes the B+ Buss bar assembly for receiving power into the PDC. In a particular embodiment the leadframe assembly or PCB assembly are utilized to distribute power within the PDC. Circuits are assigned to lead frames or PCB traces based on current thresholds, established by the design requirements and/or other applicable considerations. The PDC is configured to allow simple addition of electronic modules by providing an interface as part of the PDC, thereby allowing modules to be added without requiring a separate wiring harness for each. Terminal clips are utilized to interconnect the fuses and relays to the blades of the connectors, printed circuit board and buss bar. The terminal clips are low profile, provide for direct blade to blade mating and are keyed to retain the terminal clip to a blade.

BRIEF DESCRIPTION OF THE SEVERAL VIEWS OF THE DRAWINGS

The invention will be more fully understood from the following detailed description taken in conjunction with the accompanying drawings in which.

DETAILED DESCRIPTION OF THE INVENTION

Figure 1:
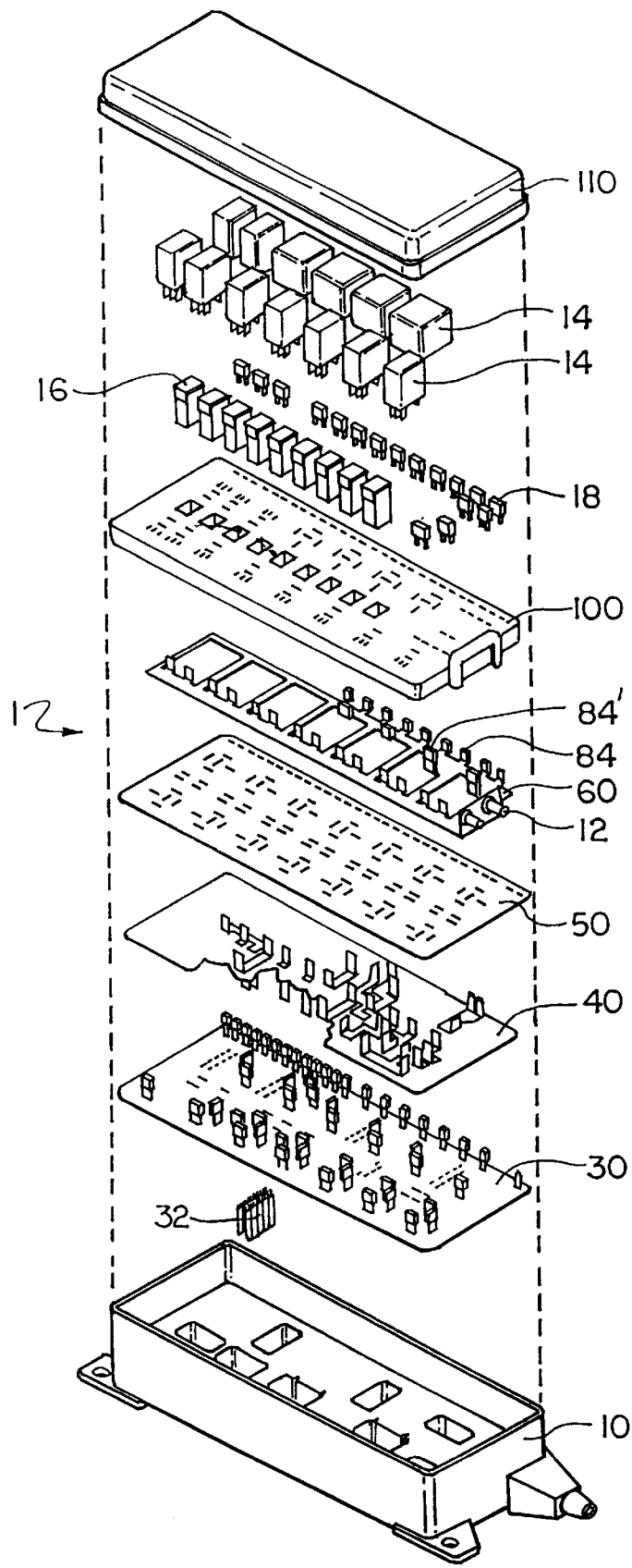
FIG. 1 is a diagram of one embodiment of a power distribution center according to the present invention.

A Power Distribution Center (PDC) 1 according to the present invention is shown in FIG. 1 in an exploded view. While a particular embodiment is described, it should be realized that other embodiments employing particular portions of the present invention are also contemplated. The PDC 1 provides for simple, efficient distribution of power within a motor vehicle. The PDC 1 has one or more external connections 12 to a power bus, such as a lead from the motor vehicle battery or alternator. The PDC 1 in this embodiment includes a plurality of relays 14, and fuses 16 and 18, as well as other electronic devices, active and passive. The PDC 1 includes a housing/connector plate 10, a printed circuit board 30, a leadframe assembly 40, an insulator 50, a B+ buss bar assembly 60, a terminal alignment plate 100 and a cover 110. In a particular embodiment the FDC includes 14 relays (1 spare), 15 mini-fuses (2 spares), and 14 cartridge fuses (2 spares).

Figure 2:
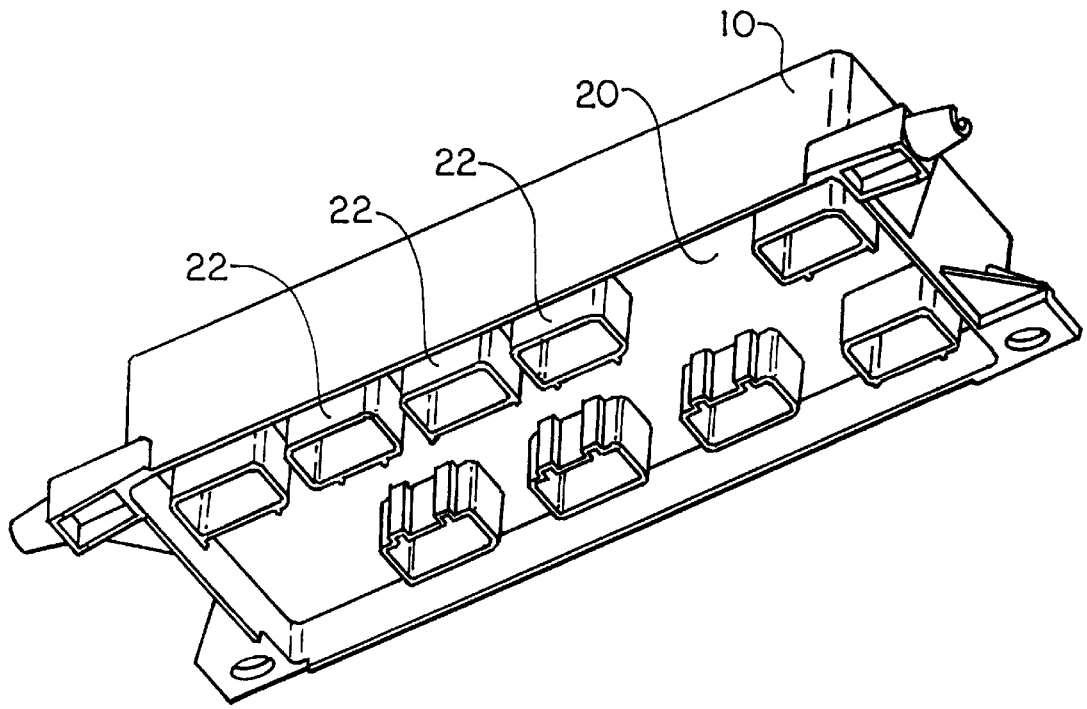
FIG. 2 is an isometric view of the housing/connector plate of the power distribution center of FIG. 1.

FIG. 2 shows a housing/connector plate 10. The housing/connector plate 10 is comprised of molded plastic or other non-conductive material, and provides a plurality of alignment walls 22 for alignment and securement of the mating wiring harness connectors (not shown) when they are installed into the housing/connector plate 10. The output connector sidewalls 22 include a latching mechanism to prevent the cooperating wiring harness connector from backing out of the connector once the harness is installed into the connector. The latching mechanism may comprise a ribbed piece, an interlock, or a bolt assist. The housing/connector plate 10 maintains all the pieces of the PDC aligned within the PDC 1, and is polarized for easier assembly and alignment within the PDC 1.

Figure 3:
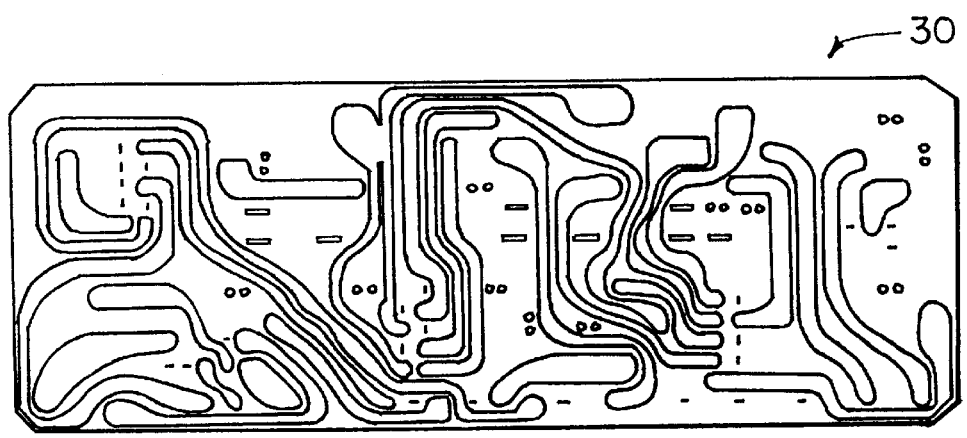
FIG. 3 is a top view of a PCB of the power distribution center of FIG. 1.

A Printed Circuit Board (PCB) assembly 30 is shown in FIG. 3. The PCB assembly 30 in this embodiment is double sided. While a specific embodiment of the PCB is described, it should be appreciated that PCBs comprised of various materials, having different measurements and different conductors could also be utilized. The PCB provides a plurality of interconnects from a first side of the fuses and/or relays (the second sides of the fuses and/or relays connect directly to the B+ buss bar) to the wiring harness connectors, and distributes power from the B+ buss bar (not shown) to various circuits and components.

Figures 3A, 3B:
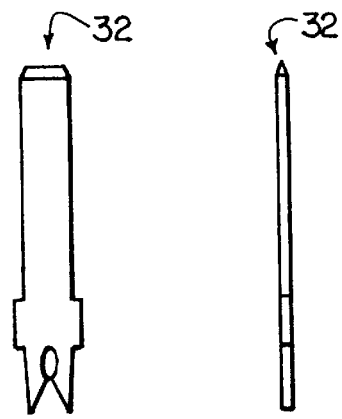
FIG. 3A is a diagram of a PCB terminal blade.

The PCB 30 includes a plurality of mechanically staked and/or soldered conductive terminal blades 32, as shown in FIG. 3A. In a specific embodiment the terminal blades 32 comprise 6.35 mm standard male blades, 2.80 mm standard male blades, modified 6.35 mm male blades for receiving a terminal clip, modified 2.80 mm male blades for receiving a terminal clip, or various combinations thereof. The PCB 30 installs into the PDC housing/connector plate 10 from the top side during assembly of the PDC 1. The 6.35 mm terminal blade is used to interface the PCB 30 with one or more cartridge fuses 16 as well as being used as an output blade of the harness connector. The 2.80 mm blade is used as an output blade to the harness connector. The modified 2.80 mm terminal blades and the modified 6.35 mm terminal blades are used for interfacing with terminal clips. The terminal clips are used to interconnect with a mini-fuse 18 or an ISO-relay 14. The PCB 30 is configured to fit within the PDC 1, and is secured therein on one side by the housing/connector plate and on the other side by a leadframe assembly 40, described below.

Figure 4:
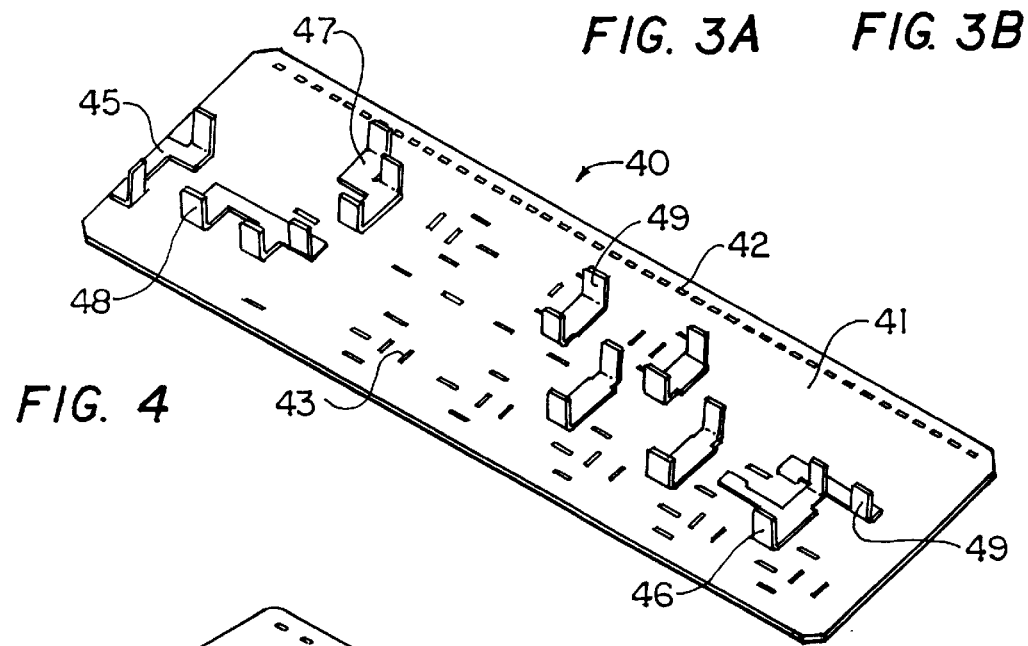
FIG. 4 is an isometric view of the leadframe assembly of the power distribution center of FIG. 1.

A leadframe assembly 40 is shown in FIG. 4, and includes a non-conductive substrate 41 comprised of plastic or the like. A plurality of conductive leadframe stampings 45–49 are mechanically attached to the non-conductive substrate. The plastic substrate 41 provides a layer cf insulation between the PCB assembly 30 and the leadframe stampings 45–49. The leadframe assembly 40 also includes a plurality of slots 43 through which the PCB terminal blades 32 pass through. The leadframe assembly 40 installs into the housing/connector plate from the top during assembly of the PDC 1.

Figure 4A:
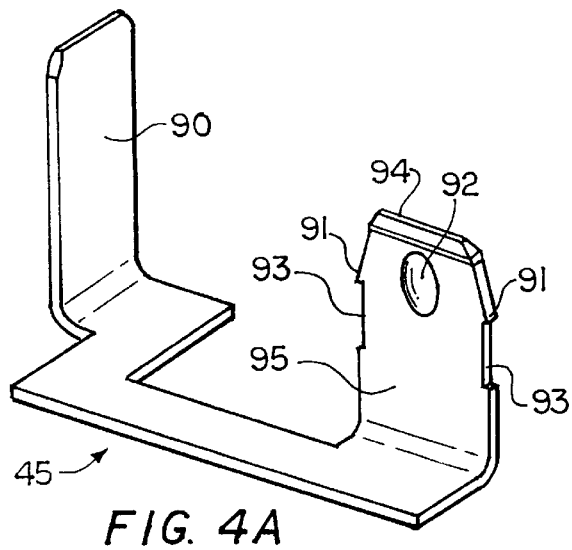
FIG. 4A is an isometric view of a first style leadframe.
Figure 4C:
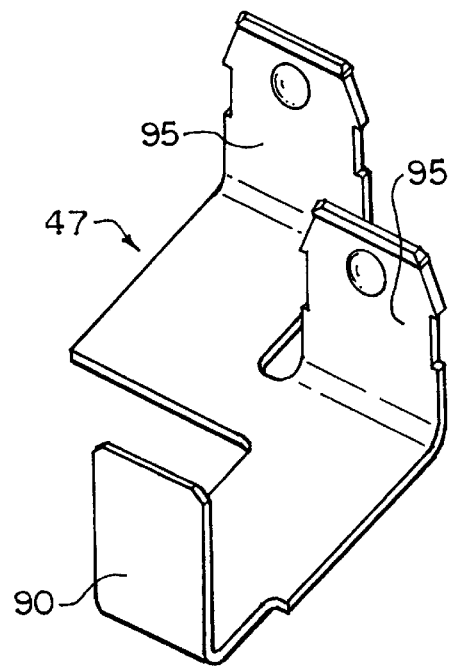
FIG. 4C is an isometric view of a third style leadframe.
Figure 4E:
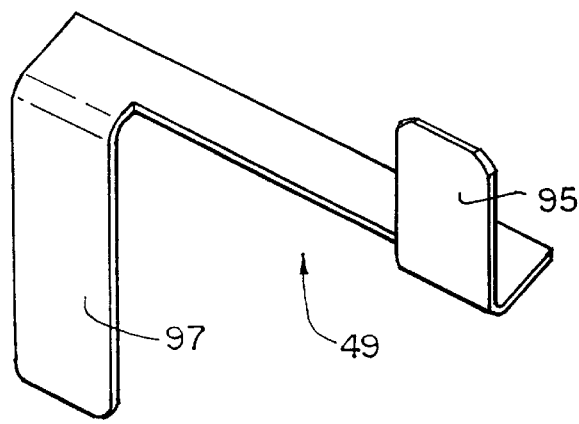
FIG. 4E is an isometric view of a fifth style leadframe.
Figure 4D:
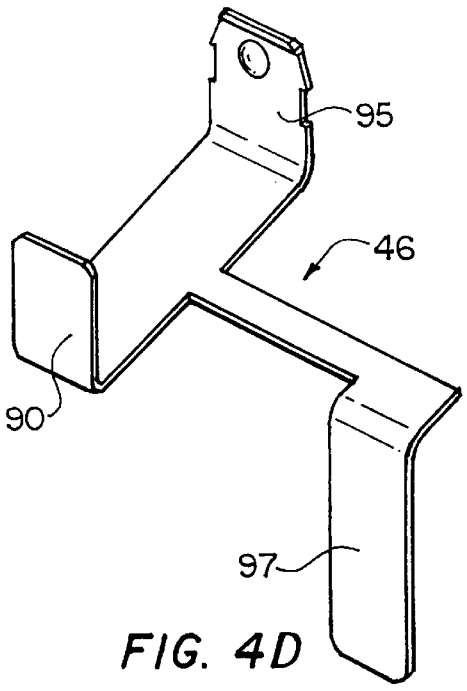
FIG. 4D is an isometric view of a fourth style leadframe.
Figure 4B:
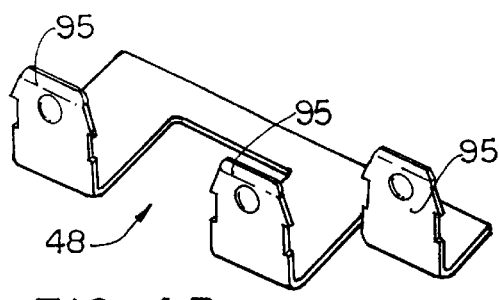
FIG. 4B is an isometric view of a second style leadframe.

A group of different styles of leadframe stampings are shown in FIGS. 4A–4E. While five leadframe stampings are shown, it should be appreciated that other styles incorporating various aspects of those disclosed are also contemplated. FIG. 4A shows a first style leadframe 45 which includes a male blade 90 for interconnecting a cartridge fuse, and a modified blade 95 for use with a terminal clip in order to interconnect with a mini-fuse or ISO-relay. The modified blade 95 has an embossed rounded area 92, a pair of retention ramps 91, edge channels or windows 93, and a tapered tip portion 94 for securing a terminal clip thereon. FIG. 4B shows a second style leadframe having three modified blades 95 for interconnecting different leads of a mini-fuse or ISO-relay. FIG. 4C shows a third style leadframe having a single male blade 90 for interconnecting a fuse, and a pair of modified blades 95 for interconnecting different leads of a relay or fuse via a terminal clip. FIG. 4D shows a fourth style leadframe having a single male blade 90, a single modified blade 95 and a harness interconnect blade 97. FIG. 4E shows a fifth style blade which has a single male blade 95 and a single harness interconnect blade 97.

Figure 5:
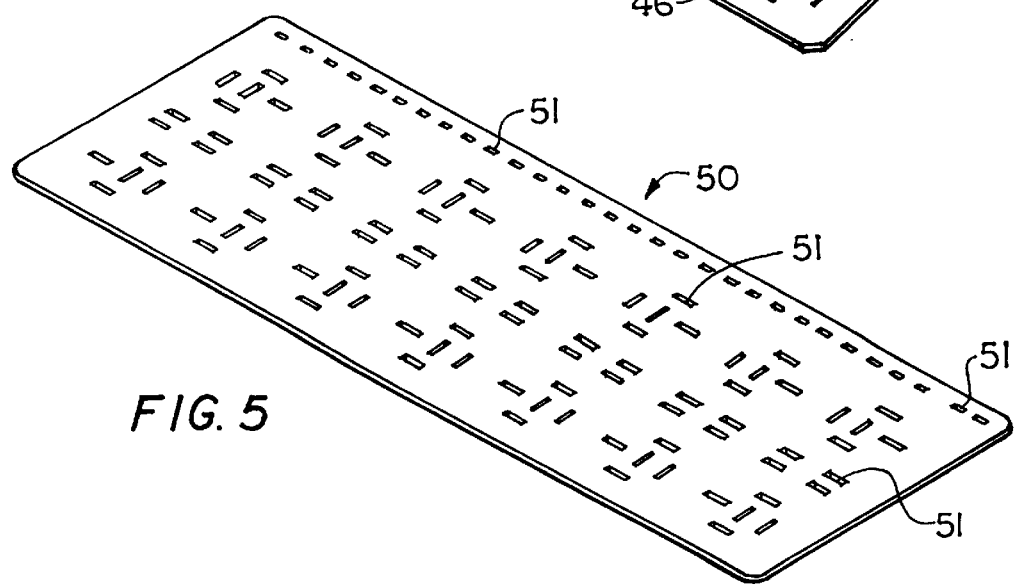
FIG. 5 is an isometric view of the insulator of FIG. 1.

An insulator 50, shown in FIG. 5, separates the B+ buss bar 60 from the leadframe stampings 45–49. The insulator 50 provides positional assurance via a pattern of slotted holes 51 to all PCB terminal blades 32 and leadframe stampings 45–49 prior to installation of terminal clips 82 and 82'. The insulator 50 installs into the housing/connector plate from the top as the third assembly component, and retains itself and prior assemblies within the housing/connector plate.

Figure 6:
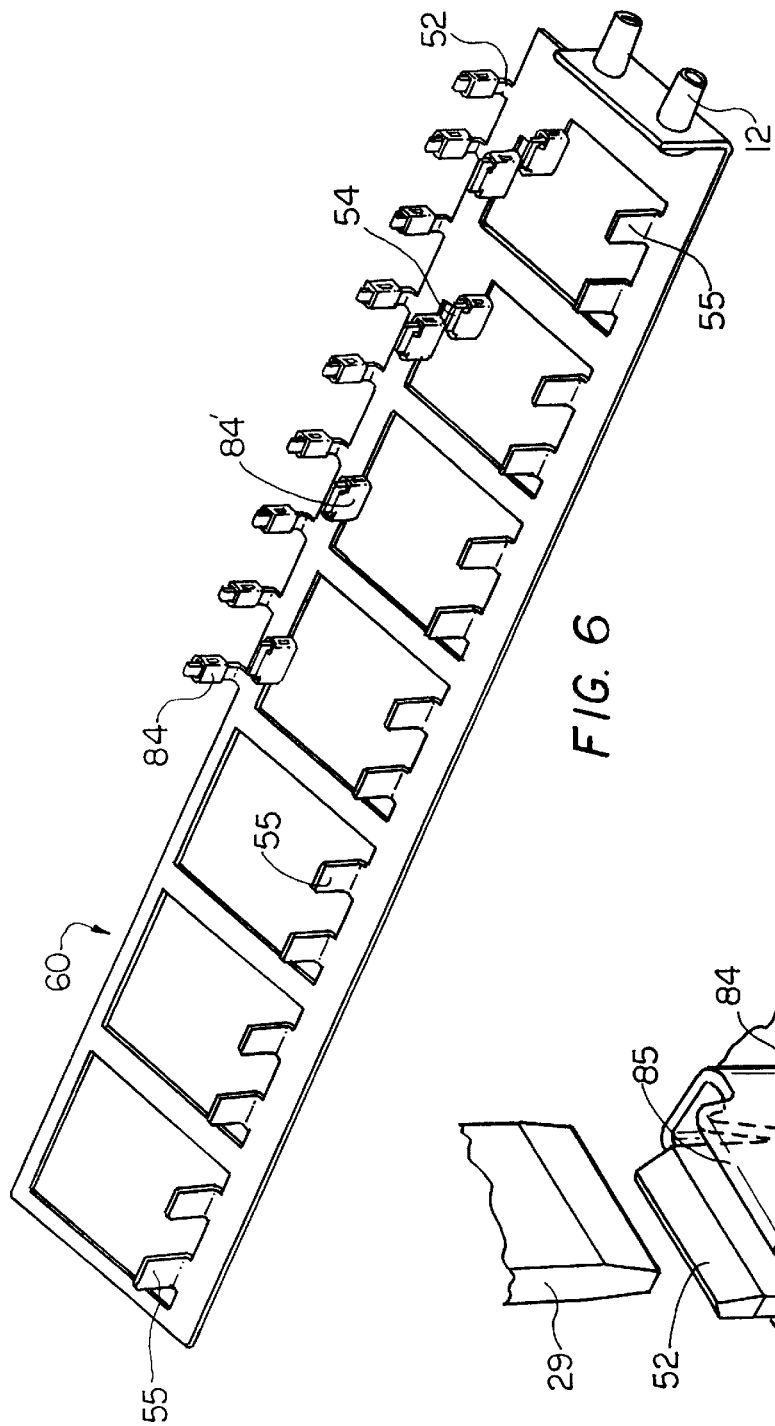
FIG. 6 is an isometric view of the B+ Buss Bar assembly of FIG. 1.

As shown in FIG. 6, the B+ buss bar assembly 60 supplies power directly to one side of the fuses and relays. The B+ buss bar is comprised of a unitary stamped piece of metal capable of carrying large currents. The B+ buss bar assembly 60 includes a pair of studs 12 for receiving a power cable from a vehicle battery or alternator. The B+ buss bar assembly 60 in this embodiment has a plurality of 2.80 mm terminal clips 84 installed for receiving the leads of mini-fuses fuses and a plurality of 6.35 mm terminal clips 84' for receiving the leads of relays. The B+ buss bar 60 also includes a plurality of blades 55 for cartridge fuse connections, blades 52 for fuse connections, and blades 54 for relay connections. The B+ buss bar assembly 50 is installed into the terminal alignment plate and mechanically attached therein for positional accuracy to prevent torque related assembly concerns at final assembly.

Figure 7:
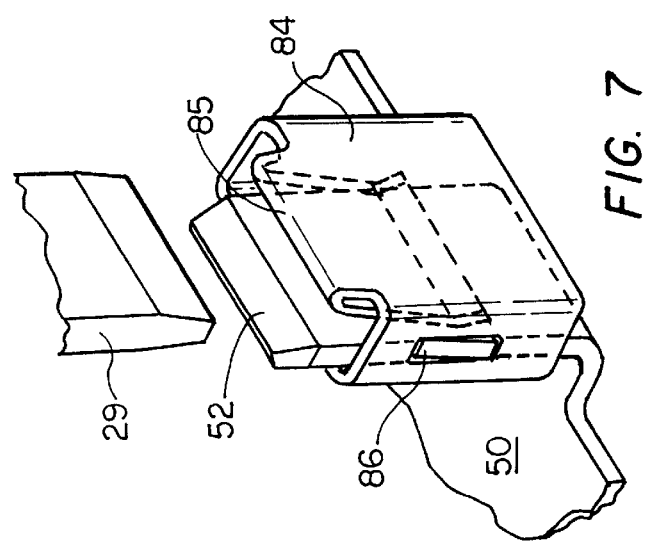
FIG. 7 is an isometric view of a terminal clip installed onto a B+ buss bar mating to a component blade.
Figure 7A:
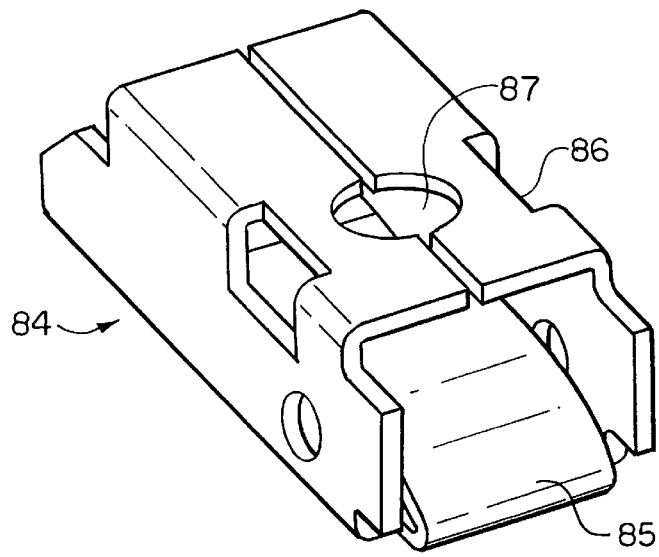
FIG. 7A is an isometric view of a terminal clip.
Figure 7B:
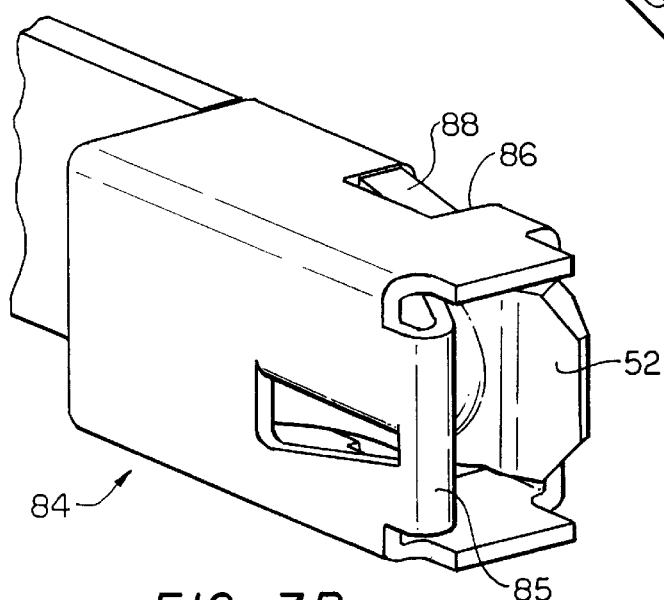
FIG. 7B is an isometric front view of the terminal clip of FIG. 7A installed on a terminal post.
Figure 7C:
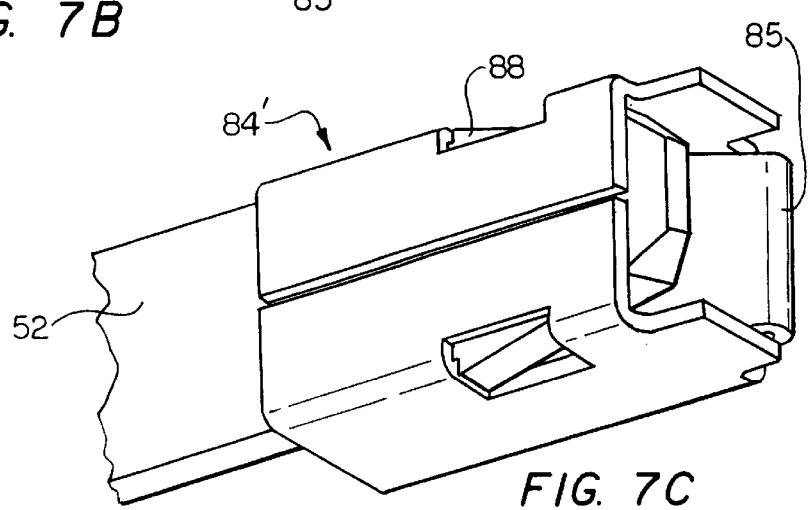
FIG. 7C is an isometric rear view of the terminal clip of FIG. 7A installed on a terminal post.

FIG. 7 shows a terminal clip 84 installed on a blade 52 of the B+ buss bar 50 and illustrates how a blade from a fuse or relay mates with a terminal as a system. FIGS. 7A–7C show terminal clips 84 and 84'. The terminal clip 84 can be configured to attach to a 2.80 mm blade, while the terminal clip 84' is configured to attach to a 6.35 mm blade. The terminal clip may be made out of conductive material, an insulative material, or an insulative material having a conductive plating and may comprise a single unitary piece. In a particular embodiment, a pair of windows 86 are configured to receive the retention ramps of the modified terminal blade therein and to secure the terminal clip to the blade. A folded over section or biasing element 85 provides a strong mating force to secure the clip to the terminal blade and the terminal blade to the blade of a relay or fuse when the relay or fuse is installed within the terminal clip 84.

The appropriate terminal clips 84 and 84' are installed onto PCB mounted terminals 32, onto the leadframe terminals 95 and to B+ buss bar terminals 52 and 54. The terminal clips 84 and 84' provide a conversion of male terminal blades into female blade receptacles. The terminal clips provide mating forces for mating of device blades to component blades within the PDC and can be installed and inspected by an automated process. Since the terminal clips provide for direct mating of the fuse or relay to the terminal blade in a surface-to-surface configuration, there is only one level of interconnection between the terminal blade and the blade of the fuse or relay, as opposed to known devices which provide a double female interface such that one end of the double female interface connects to a lead and the other end to a device, thus requiring two levels of interconnection. As such, the present terminal clip is more efficient and is more reliable due to the fewer levels of interconnect.

Referring now to FIGS. 7–7C, a terminal clip 84 is shown installed on a B+ buss bar blade 52. When the mating blade of a relay or fuse 89 is inserted into the terminal clip 84, the biasing element 85 provides a strong mating force to maintain the mating blade 89 in mechanical and electrical contact with the B+ buss bar blade 52. There is only a single level of interconnect between the b+ buss bar blade and the mating blade in contrast to traditional double female type clips. Further, by utilizing only a single level of interconnect, the height of the interface is reduced.

Figure 8:
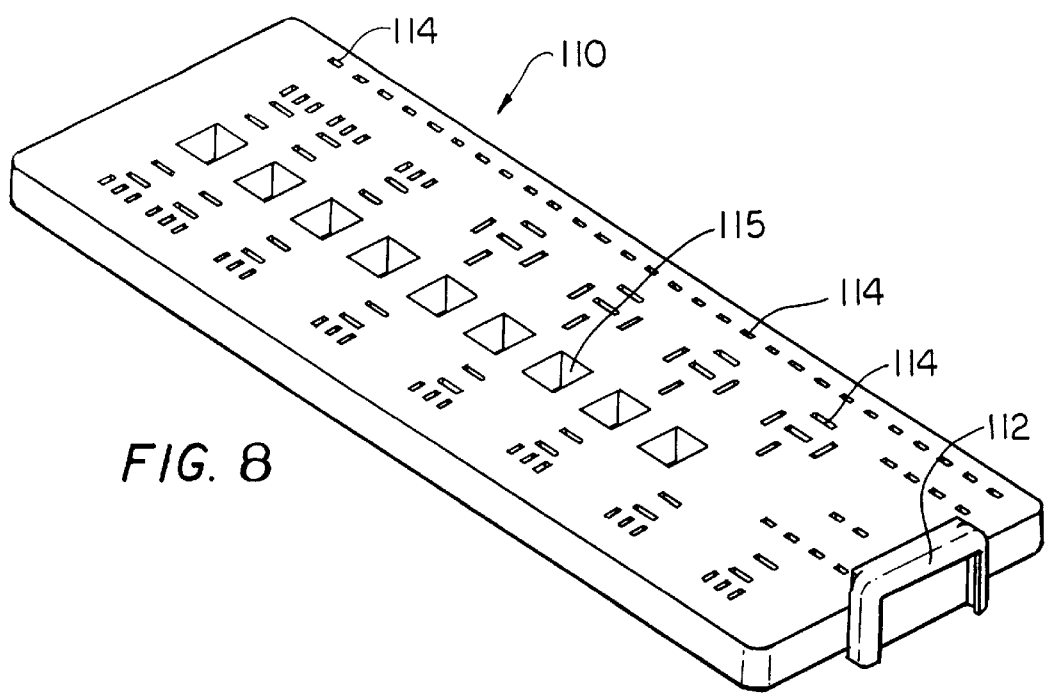
FIG. 8 is an isometric view of an alignment plate of FIG. 1.

FIG. 8 shows an alignment plate 100. The alignment plate 100 is comprised of non-conductive material and includes a plurality of slots 114 which allow terminal blades and/or stake pins to pass therethrough. The alignment plate further includes a plurality of recesses 115 for receiving cartridge fuses therein. Additionally, the alignment plate keeps the blades aligned and thus prevents inadvertent shorting of one blade to another.

The final assembly step comprises the housing/connector plate with all sub-assembly layers installed, all the fuses and relays installed and is then ready for cover 110 installation at the final assembly plant. All the components and subassembly items install from one side and are polarized to eliminate misassembly.

Figure 9:
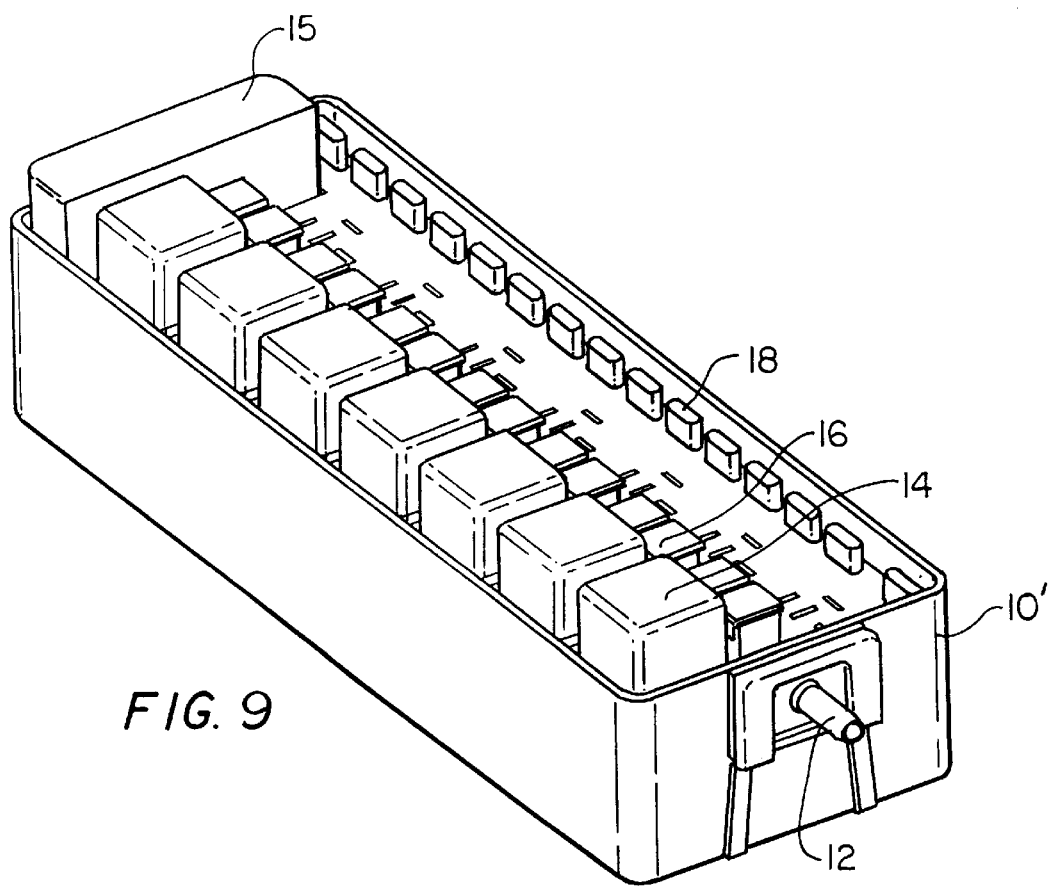
FIG. 9 is a diagram of another embodiment of a power distribution center.
Figure 9A:
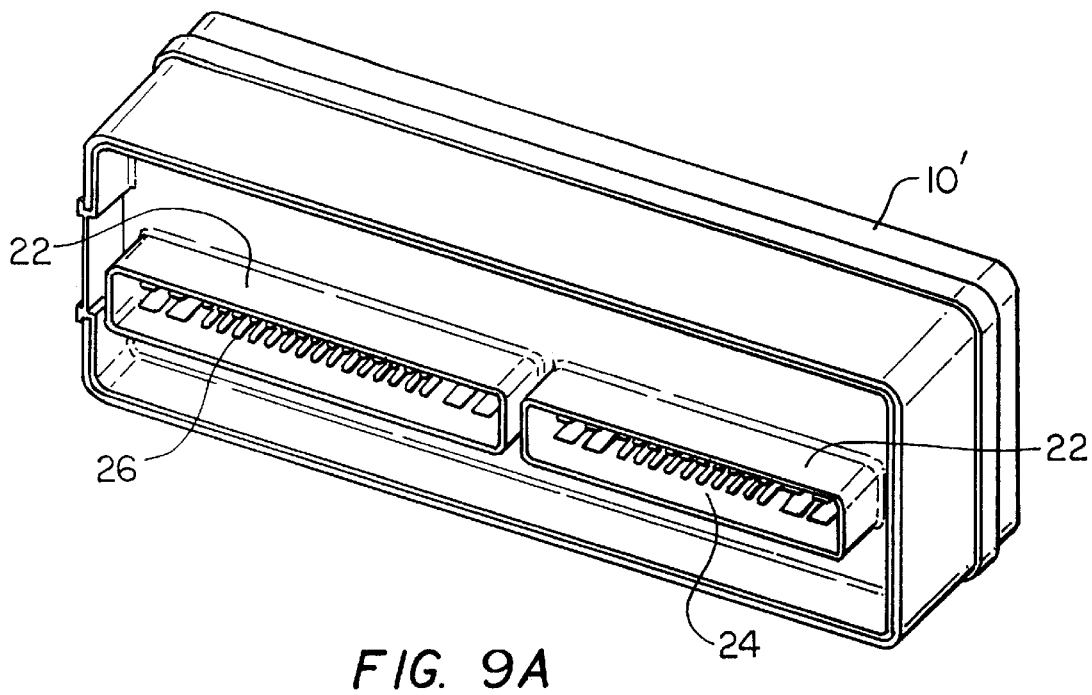
FIG. 9A is an isometric view of the housing/connector plate of the power distribution center of FIG. 9.
Figure 9B:
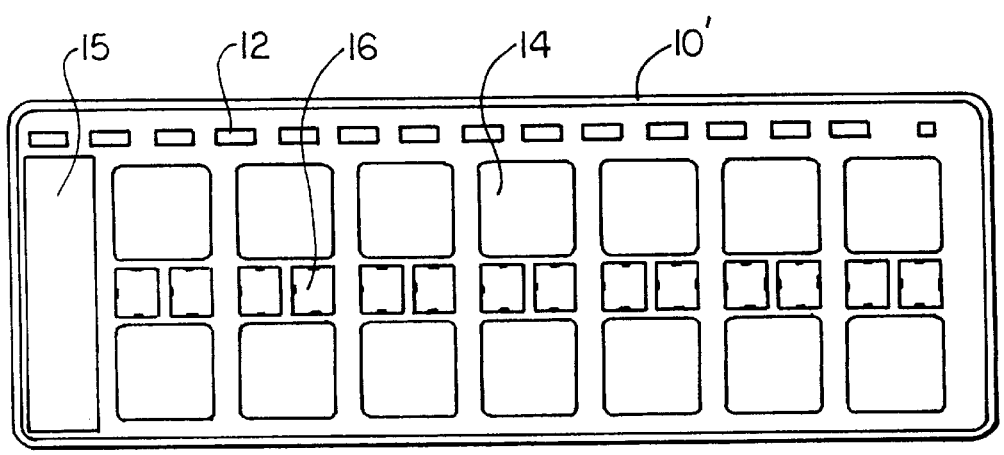
FIG. 9B is a top view of the power distribution center of FIG. 9.

Referring now to FIGS. 9–9B, an additional embodiment of a power distribution center 10' is shown. This embodiment is similar to the embodiment described above except that this embodiment utilizes a single power stud 12, and only two output connectors 22 and 24 as shown in FIG. 8. Also shown in this embodiment is a electronic module interface 15. The electronic module interface may be provided as an integral part of the power distribution center or provided separately as an add on piece. The electronic module interface may also be used with other embodiments of the PDC as a separate add on module. Electronic modules may include, but are not limited to, multiplex interfaces, body control modules, diagnostic modules, and the like. Direct connection to these modules results in fewer wires and less interconnections within the vehicle.

FIG. 9A shows the housing/connector plate 10' used for new vehicles which includes sidewalls 22 surrounding a first output connector 24 for receiving a powertrain wire harness (not shown). A second output connector 26 is configured to receive a body harness (not shown).

The PDC 1 improves reliability by reducing the number of wires and interconnects, thereby reducing warranty claims for new vehicles. The PDC can be built using automated assembly equipment, can incorporate automatic in-line testing and prevents improper insertion of components.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

We claim:

1. A power distribution center for a vehicle comprising:
   a housing/connector plate including a wiring harness connector having a plurality of contacts;
   at least one conductive assembly disposed within said power distribution center, said conductive assembly comprising
   a printed circuit board having a plurality of conductive etches formed thereon and therein; and
   a plurality of terminal blades disposed on said printed circuit board, selected ones of said plurality of terminal blades in electrical communication with selected ones of said plurality of contacts through selected ones of said conductive etches;
   a leadframe assembly including a non-conductive substrate having at least one leadframe stamping attached thereto, said at least one leadframe stamping isolated from said printed circuit board; and
   a power bus bar having a power connection and a plurality of terminal blades extending therefrom, disposed within said power distribution center.

2. The power distribution center of claim 1 further comprising a plurality of terminal clips configured to mate predetermined ones of said conductive assembly terminal blades and power buss bar terminal blades to a component.

3. The power distribution center of claim 2 wherein said component comprises a fuse.

4. The power distribution center of claim 2 wherein said component comprises a relay.

5. The power distribution center of claim 1 further comprising an insulator disposed between said power bus bar and said conductive assembly.

6. The power distribution center of claim 1 further comprising an alignment plate disposed above said power bus bar.

7. The power distribution center of claim 1 further comprising a cover removably attachable to said housing/connector plate.

8. The power distribution center of claim 1 further comprising a power distribution center module including an electronic module interface, disposed within said power distribution center.

9. The power distribution center of claim 8 wherein said electronic module interface comprises a multiplex bus interface.

10. The power distribution center of claim 8 wherein said module is removable from said power distribution center.

11. The power distribution center of claim 8 wherein said module interface is integral with said power distribution center.

12. The power distribution center of claim 2 wherein said plurality of terminal clips different are selected from the group consisting of 2.80 mm terminal clips and 6.35 mm terminal clips.

13. The power distribution center of claim 1 wherein said wiring harness connector is configured to mate with a vehicle wiring harness.

* * * * *

UNITED STATES PATENT AND TRADEMARK OFFICE
CERTIFICATE OF CORRECTION

PATENT NO. : 6,015,302
DATED : January 18, 2000
INVENTOR(S) : Lawrence D. Butts, et al.

It is certified that error appears in the above-identified patent and that said Letters Patent is hereby corrected as shown below:

Please see corrected FIG. 8 below, which changes "110" to --100-

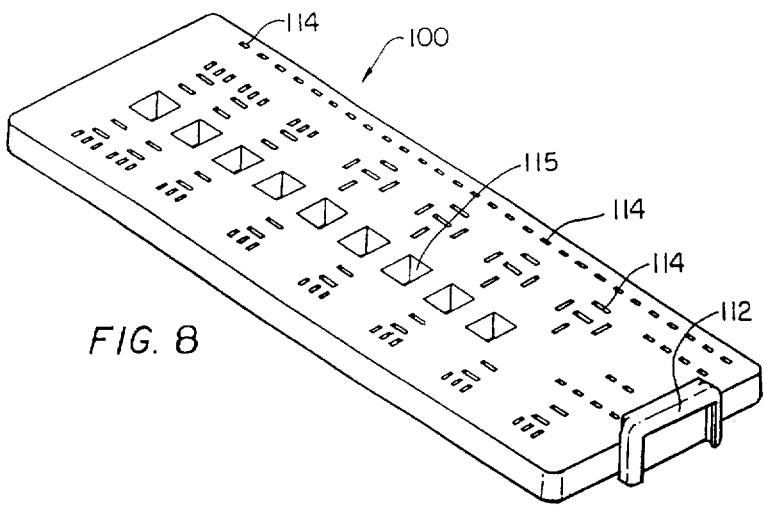

FIG. 8

Signed and Sealed this

Eighth Day of May, 2001

*Attest:*

NICHOLAS P. GODICI

*Attesting Officer*   Acting Director of the United States Patent and Trademark Office